United States Patent [19]

Toda et al.

[11] Patent Number: 5,346,650
[45] Date of Patent: Sep. 13, 1994

[54] GRAPHITE INTERLAMINAR COMPOUND AND METHOD FOR PRODUCING THE SAME

[75] Inventors: Osamu Toda, Sendai; Michio Inagaki; Masahiko Ohhira, both of Sapporo, all of Japan

[73] Assignee: Alps Electric Co., Ltd., Tokyo, Japan

[21] Appl. No.: 107,419

[22] Filed: Aug. 16, 1993

Related U.S. Application Data

[63] Continuation of Ser. No. 785,853, Oct. 31, 1991, abandoned.

[30] Foreign Application Priority Data

Nov. 2, 1990 [JP] Japan .................... 2-295516

[51] Int. Cl.$^5$ ........................ H01B 1/00; H01B 1/04
[52] U.S. Cl. ........................ 252/506; 252/518; 423/448; 423/494; 428/408
[58] Field of Search ............ 252/506, 518; 423/448, 423/494; 428/408

[56] References Cited

U.S. PATENT DOCUMENTS

| 4,113,784 | 9/1978 | Billings | 260/607 |
| 4,463,212 | 7/1984 | Imai | 585/530 |
| 4,729,884 | 3/1988 | Sugiura et al. | 252/506 |
| 4,887,273 | 12/1989 | Komatsubara et al. | 372/41 |

OTHER PUBLICATIONS

E. Stumpp, "Chemistry of Graphite Intercalation Compounds of the Acceptor Type," *Physica 105B*, 1981, pp. 9–16.

*Primary Examiner*—Paul Lieberman
*Assistant Examiner*—M. Kopac
*Attorney, Agent, or Firm*—Guy W. Shoup; Patrick T. Bever; Laura Terlizzi

[57] ABSTRACT

Graphite intercalation compound interposing at least $PbCl_2$ interlaminarly among graphite, synthesized by mixing a raw material graphite, $PbCl_2$, and a metal halide other than $PbCl_2$ and heating the mixture.

5 Claims, 4 Drawing Sheets

GRAPHITE INTERLAMINAR COMPOUND AND METHOD FOR PRODUCING THE SAME

This application is a continuation of application Ser. No. 07/785,853, filed Oct. 31, 1991, now abandoned.

BACKGROUND OF THE INVENTION

1) Field of the Invention

The present invention relates to a graphite intercalation compound having a lower resistivity for use as a conductive material, more specifically to a graphite intercalation compound containing a metal halide as the guest and also relates to a method for producing the same.

2) Description of the Related Art

Graphite intercalation compounds are compounds wherein atoms, molecules and ions are intercalated into graphite. The practical value thereof has been drawing attention recently because of the improved functional properties such as the low resistivity comparable to metal and the excellent discharge and frictional properties and also because of the relatively easy synthesis.

Because the graphite intercalation compounds, incorporating as the intercalates metal halides such as $FeCl_3$, $CuCl_2$ and the like, demonstrate a higher conductivity and are substantially stable in the atmosphere, the application thereof as conductive materials is now expected.

It is known that the graphite intercalation compounds containing a metal halide as the intercalate can be synthesized and produced by reacting graphite with a metal halide at a predetermined temperature according to a mixing method.

The present inventors have carried out the environmental test of known graphite intercalation compounds (abbreviated as GIC often hereinafter) containing metal halides as the intercalate in an atmosphere of a high humidity. They have found that in such an atmosphere the change with time of the resistance value of $NiCl_2$—$CuCl_2$—GIC, otherwise considered to be stable, is large.

In order to apply a conductive paste containing a metal halide GIC dispersed in an organic binder to an electronic device, it must be guaranteed that the properties thereof won't change in actual environment for a long period of time. It is certainly known that the GIC is stable to heat up to about 200° C. However, when an environmental test was carried out in such a manner that the paste was printed and thermally cured to experimentally make an electric conductor which was then left to stand in an atmosphere of a high humidity of 90% RH at 40° C., the known metal halide GIC, considered as a stable compound in the atmosphere, was found to have a non-negligibly larger change of the resistance value with time. In the case of an electric conductor experimentally made from $FeCl_3$—GIC, the resistance value thereof increased by 30% when 100 hours passed.

Conventionally known metal halide GICs have inadequate stability in an atmosphere of high humidity as has been described above, which is a serious drawback for putting such GICs into practical use as conductive materials.

SUMMARY OF THE INVENTION

It is a first objective of the present invention to provide a metal halide graphite intercalation compound with great moisture-resistant stability. It is a second objective of the present invention to provide a method for producing such a graphite intercalation compound.

The first objective of the present invention described above is achieved by intercalating a guest containing at least $PbCl_2$ into graphite having a laminar crystalline structure.

There has been found no example in which $PbCl_2$ is intercalated into graphite. It has been considered that a graphite intercalation compound won't be formed from $PbCl_2$ alone under any condition. According to the present invention, however, a mixture of $PbCl_2$ and a second metal halide singly capable of reacting with graphite to form a graphite intercalation compound, is reacted with graphite under predetermined synthesis conditions, whereby the second metal halide simultaneously incorporates $PbCl_2$ interlaminarly in the graphite during the reaction of the former with graphite, so that both the $PbCl_2$ and the metal halide other than $PbCl_2$ can be intercalated into graphite.

The second objective of the present invention described above can be achieved by mixing a raw material graphite with $PbCl_2$ and a metal halide other than $PbCl_2$, heating the mixture at a temperature between 300° C. and 550° C., thereby reacting the mixture together for a period of time sufficient to increase the weight of the raw-material graphite by the synthesis of a graphite intercalation compound.

According to the experiments of the present inventors, it has been confirmed that a graphite intercalation compound, synthesized so that the compound contains at least $PbCl_2$ as the guest, not only demonstrates a higher conductivity but also a remarkably improved moisture-resistant stability compared with the stability of known metal halide GICs. This is due to the fact that most metal halides are deliquescent and easily soluble in water, while $PbCl$ is exceptionally not deliquescent and is slightly soluble in water. The graphite intercalation compound is considered to have excellent moisture-resistant stability, as described in detail hereinafter, due to such properties of $PbCl_2$. That is, the interculated substance (metal halide) is known to have nearly the same structure as the one prior to the insertion, which is a possible reason why the resulting graphite intercalation compound has excellent moisture-resistant stability.

According to the results confirmed by the present inventors, furthermore, it is indicated that the moisture-resistant stability is related to the amount of $PbCl_2$ intercalated into the graphite intercalation compound. $PbCl_2$ and $FeCl_3$ are employed as intercalates in one example as shown in FIG. 5. In FIG. 5, the increase in the molar ratio of Pb/Fe in an intercalated substance causes the increase in the moisture-resistant stability. If the molar ratio of Pb/Fe is 0.05 or more, the graphite intercalation compound has a higher moisture-resistant stability than conventional $FeCl_3$—GIC. If the ratio is 0.24 or more, the compound demonstrates a moisture-resistant stability sufficient for practical use; and if the ratio is 0.5 or more, the moisture-resistant stability is improved up to a value identical to that of the graphite host.

In accordance with the present invention, the metal halide concurrently used with $PbCl_2$ enables the intercalation of $PbCl$ in graphite. Halides such as $FeCl_3$, $CuCl_2$, $AlCl_3$, $GaCl_3$, $CoCl_2$, $MnCl_2$, $CrCl_3$, $MoCl_5$, $CdCl_2$ and the like, are used. Among them, $FeCl_3$ and $CuCl_2$ are preferable in that no introduction of toxic chlorine gas from outside is required because they generate chlorine gas by disproportionation and in that the most appropriate temperature range for reacting graphite with them, namely 300° C. to 550° C., is industrially advantageous.

For the production of the graphite intercalation compound of the present invention, the ratio of host and guest, the charge ratio in the guest of $PbCl_2$ and other metal halides, and the synthesis conditions are important. If the conditions vary, the properties of a graphite intercalation compound thus obtained are different.

The ratio of $PbCl_2$ in the guest of a graphite intercalation compound, which controls the moisture-resistant stability, is related to both the charge ratio of the materials $PbCl_2$ and another metal halide and to the synthesis temperature. A larger charge ratio of $PbCl_2$ and a higher synthesis temperature cause an increase in the amount of Pb in a graphite intercalation compound, thus leading to the moisture-resistant stability. In the case where natural graphite of an average particle size of 10 μm is employed as the host while $PbCl_2$ and $FeCl_3$ are employed as the guests and the synthesis is effected in a sealed tube, for example, a small amount of $PbCl_2$ is intercalated into graphite along with $FeCl_3$ at a synthesis temperature of 300° C. or more, as shown in the region formed by dashed lines in FIG. 6. In the region with slanting lines (Region A), there can be obtained a graphite intercalation compound having moisture-resistant stability equal to the stability of the host graphite or having sufficient stability for practical use. In the region most preferable for practical use, the upper limit of the synthesis temperature is 954° C., which is determined by the fact that the vaporization of the metal halide used as a reactive substance remarkably increases the pressure inside a reaction vessel, causing a dangerous situation and by the boiling point of $PbCl_2$ being 954° C.

The charge ratio of $PbCl_2$ and $FeCl_3$ is in the range from $PbCl_2$ of 95% and $FeCl_3$ of 5% to $PbCl_2$ of 40% and $FeCl_3$ of 60%. This range is determined because only an extremely small amount of $FeCl_3$ is reacted with graphite due to the insufficiency of $FeCl_3$ which works to introduce $PbCl_2$ interlaminarly among graphite in the case where the ratio of $FeCl_3$ is too small in the mixture, and because $FeCl_3$ is preferentially reacted with graphite so that almost no $PbCl_2$ is inserted among graphite in the case where the ratio of $FeCl_3$ is too large.

In the case where a metal halide other than $FeCl_3$ is used together with $PbCl_2$, the graphite intercalation compound as the objective can be obtained by modifying the synthesis conditions appropriately.

BRIEF DESCRIPTION OF THE DRAWINGS

All the graphs relate to the embodiments of the present invention.

DESCRIPTION OF THE PREFERRED EMBODIMENTS

The embodiments of the present invention will now be explained hereinafter.

Example 1

By employing natural graphite of an average particle size of 10 μm as the host and modifying the charge ratio and the synthesis temperature, nine types of $PbCl_2$—$FeCl_3$—GIC were synthesized according to a mixing method. The raw material graphite, $PbCl_2$ and $FeCl_3$ were placed and mixed together at a predetermined charge ratio in a Pyrex-glass reaction tube. The tube and its contents were dehydrated by heating at 120° C. for one hour under vacuum suction. Then, the reaction tube was sealed by glass fusion and heated at a predetermined reaction temperature between 300° C. and 540° C. for 24 hours. The resulting reaction product was repeatedly washed in boiling water and methanol, to remove the unreacted metal halide on the sample surface to obtain samples Nos. 1 to 9 (graphite intercalation compounds) shown in Table 1.

TABLE 1

| Sample No. | Charge ratio (molar ratio) graphite: $PbCl_2$:$FeCl_3$ | Synthesis Temperature (°C.) | Heating time (H) | Resistivity (mΩ · cm) | Pb/Fe ratio after synthesis (molar ratio) | Weight of guest to weight of host (%) |
|---|---|---|---|---|---|---|
| 1 | 5:0.8:1.2 | 300 | 24 | 4.0 | 0.0056 | 43.4 |
| 2 | 5:1:1 | 300 | 24 | 4.6 | 0.0089 | 68.2 |
| 3 | 5:1.2:0.8 | 300 | 24 | 4.0 | 0.0130 | 77.4 |
| 4 | 5:0.8:1.2 | 450 | 24 | 3.4 | 0.1221 | 96.0 |
| 5 | 5:1:1 | 450 | 24 | 3.5 | 0.1480 | 112.6 |
| 6 | 5:1.2:0.8 | 450 | 24 | 3.3 | 0.5690 | 83.2 |
| 7 | 5:0.8:1.2 | 540 | 24 | 3.2 | 0.0571 | 81.1 |
| 8 | 5:1:1 | 540 | 24 | 3.2 | 0.2424 | 102.2 |
| 9 | 5:1.2:0.8 | 540 | 24 | 3.8 | 0.6070 | 87.2 |

The resistivity of each sample was measured according to four probe method comprising molding under the state of pressure loaded to each powdery sample and measuring a compressed potential difference. The results are also shown in Table 1. The resistivity of a raw material graphite was 8.6 mΩ.cm.

As is shown in the Table, there is observed a tendency that the ratio of Pb to Fe in the synthesized graphite intercalation compound is higher at a larger charge ratio of $PbCl_2$ and a higher synthesis temperature, namely the tendency that $PbCl_2$ is more easily intercalated into graphite.

As to the resistivity, there was observed a tendency that the resistivity got lower as the weight of guest to that of host was increased, and that the resistivity was about ½ to ⅓ that of the host if the weight of the guest was 40% or more. Thus, the resultant graphite intercalation compound showed a conductivity almost as high as that of FeCl$_3$—GIC. The values shown in Table 1 are the resistivities of the pressed powder compacts of the samples, including the contact resistance between particles, so the values are possibly slightly larger than the inherent resistivities of the products.

Figure 1:
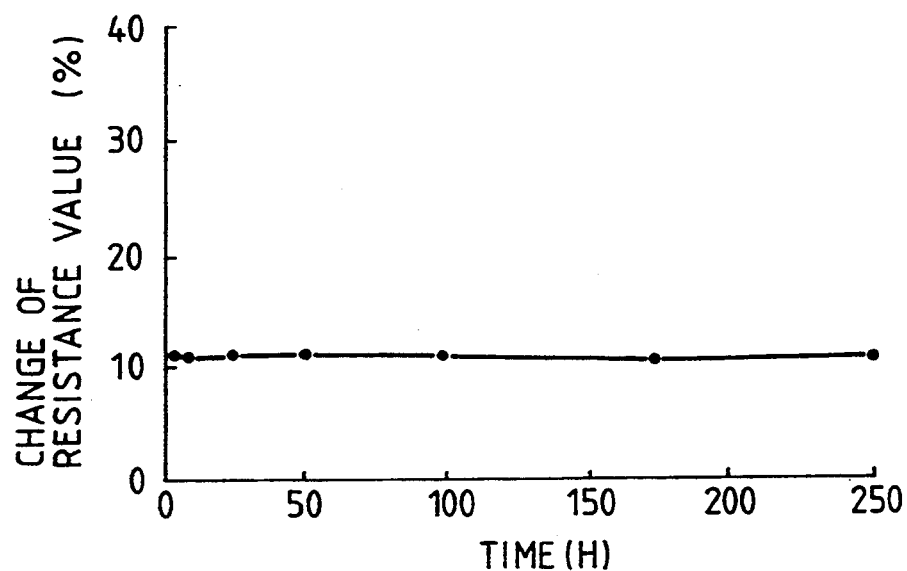
FIG. 1 is a characteristic graph of the moisture-resistant stability of raw-material graphite.
Figure 2:
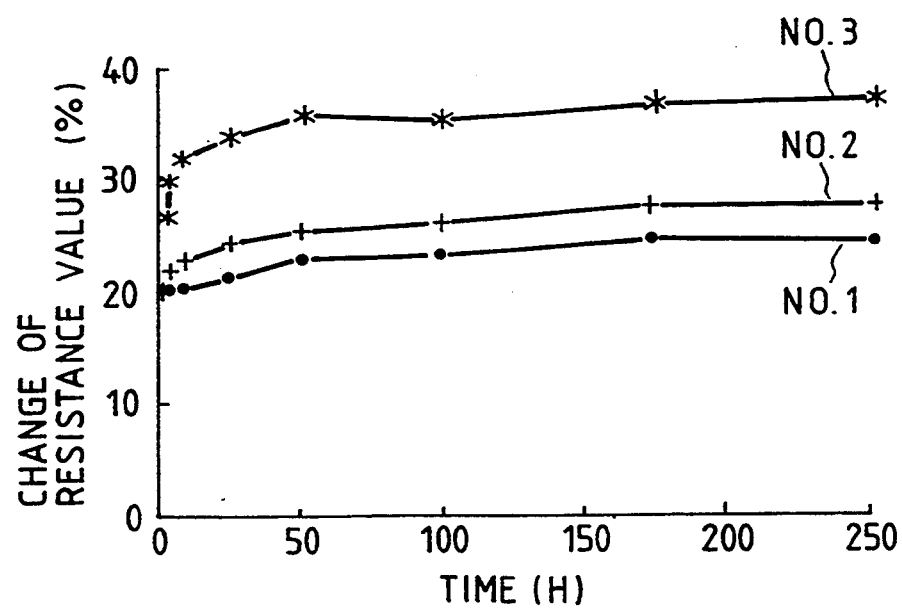
FIG. 2 is a characteristic graph representing the moisture-resistant stability of each sample synthesized at a temperature of 300° C.
Figure 3:
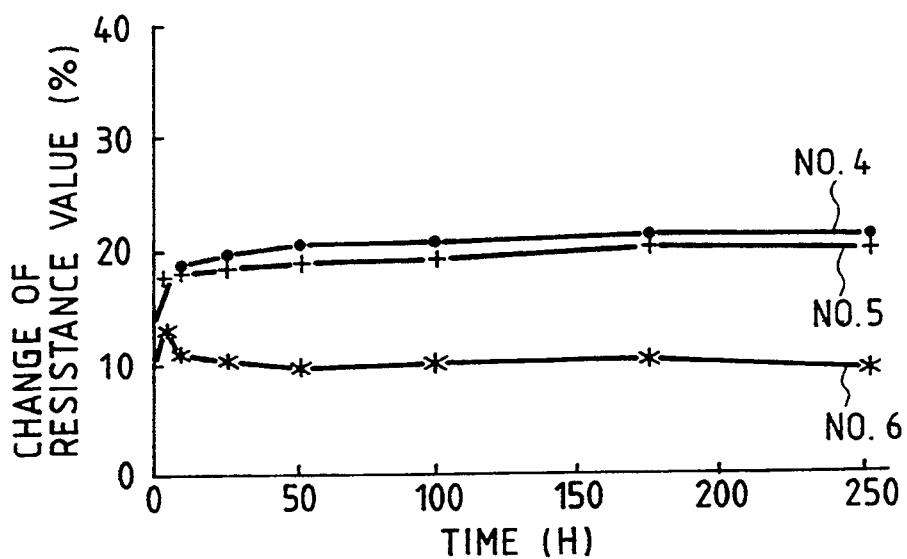
FIG. 3 is a characteristic graph representing the moisture-resistant stability of each sample synthesized at a temperature of 450° C.
Figure 4:
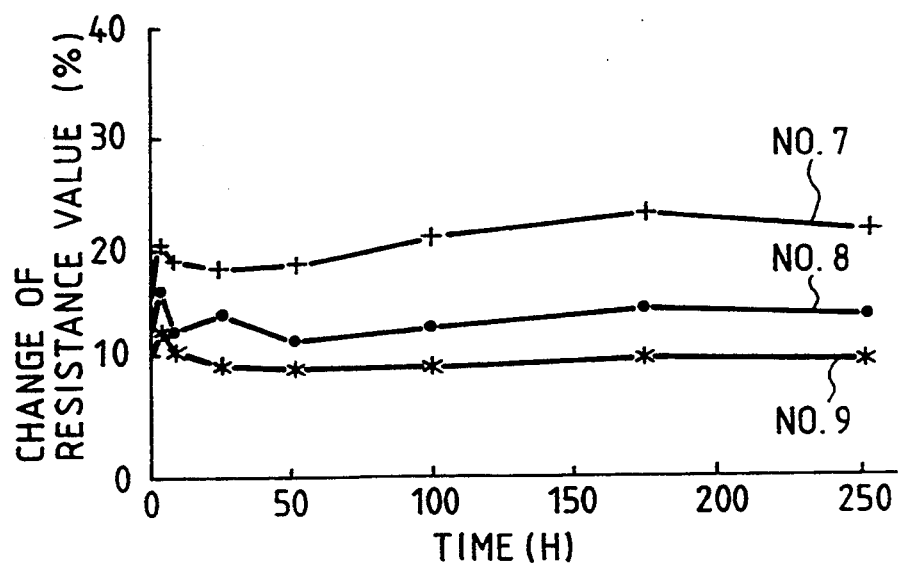
FIG. 4 is a characteristic graph representing the moisture-resistant stability of each sample synthesized at a temperature of 540° C.
Figure 5:
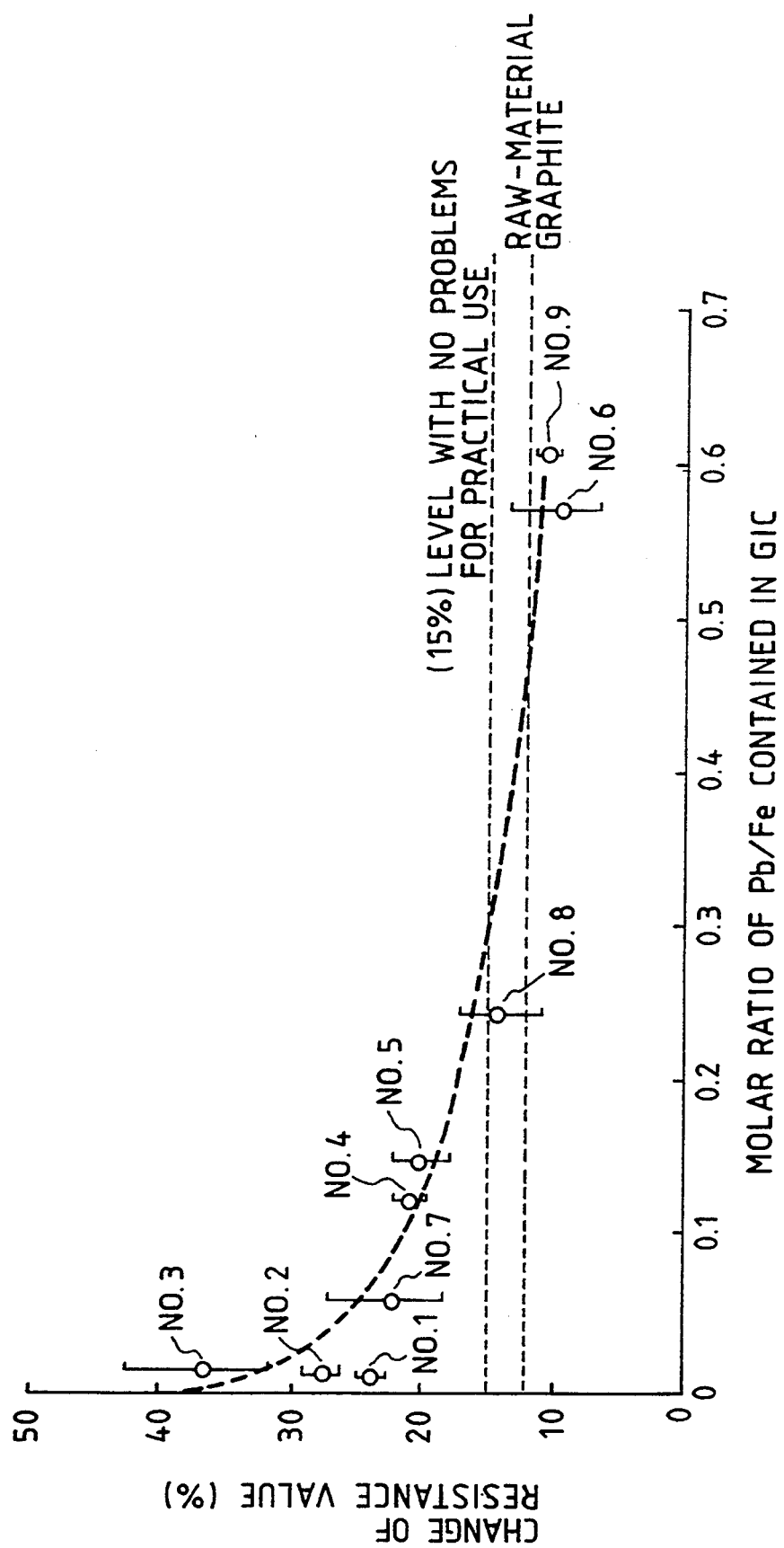
FIG. 5 is a graph representing the molar ratio of Pb/Fe contained in the GIC of each sample and the results of the evaluation thereof after 250 hours in humidity.
Figure 6:
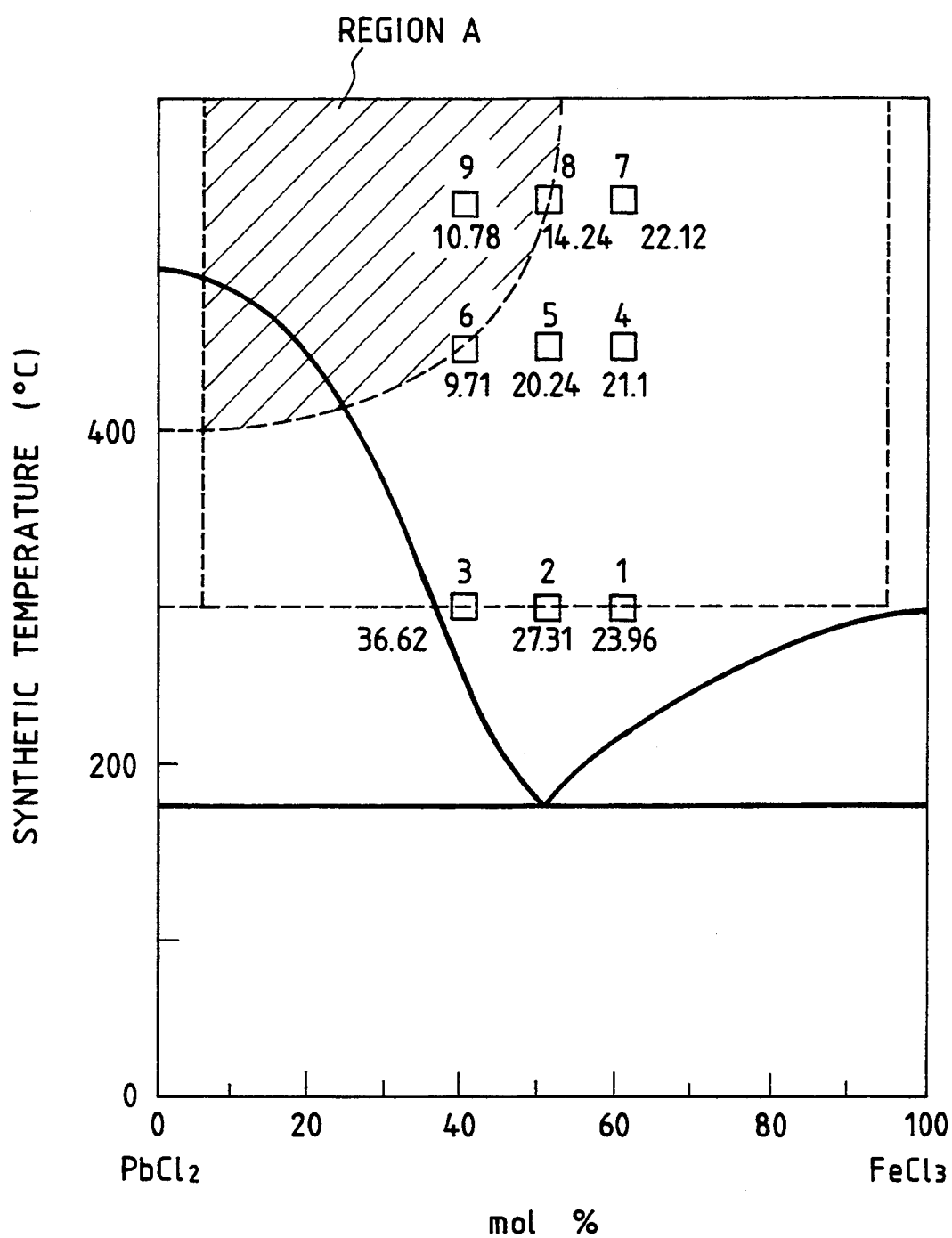
FIG. 6 is a graph wherein the synthesis condition of each sample is plotted on the graph representing the state of $PbCl_2$- $FeCl_3$.

Then, the samples No. 1 to 9 shown in Table 1 were individually dispersed in an organic binder (phenolic resin) to be changed into pastes, which were then printed and thermally cured to experimentally make electric conductors. These electric conductors were left to stand in an atmosphere of a high humidity of 90% RH at 40° C., to measure resistance values with time for the evaluation of moisture-resistant stability of each sample. The results are shown in FIGS. 1 to 6. FIG. 1 shows the results of the measurement of the raw-material graphite; FIG. 2 shows the results of the measurement of samples Nos. 1 to 3; FIG. 3 shows the results of the measurement of samples Nos. 4 to 6; FIG. 4 shows the results of the measurement of samples Nos. 7 to 9; FIG. 5 shows the results of the measurement of the molar ratio of Pb/Fe in the GICs of samples Nos. 1 to 9, along with the results of their evaluation after 250 hours in humidity; FIG. 6 shows a graph where the synthesis conditions of samples Nos. 1 to 9, namely charge ratio and synthesis temperature, are plotted on the graph showing the state of PbCl$_2$—FeCl$_3$. In FIG. 6, the numerical figure above each point shows the sample number and the numerical figure under each point shows the results of the evaluation of the percentage change of the resistance value after 250 hours in humidity. For comparison, a conductive material was experimentally made of the paste with FeCl$_3$—GIC being dispersed in an organic binder, and the percentage change of the resistance value of the electric conductor was then measured under the same condition. Even after 100 hours, the percentage change of the resistance value was not saturated, and the resistance value increased by 27% on average compared with the initial value.

As shown in FIGS. 2 to 6, the electric conductor incorporating PbCl$_2$—FeCl$_3$—GIC as the conductive material had a lower rate of change of the resistance value with time in an atmosphere of high humidity, and the GIC synthesized under the synthesis condition shown in Region A of FIG. 6 contains Pb of 0.2 or more as a molar ratio of Pb and Fe in the GIC. The electric conductor shows excellent moisture-resistant stability almost equal to the stability of the raw-material graphite or a degree of stability sufficient for practical use.

There are explained hereinbelow examples of syntheses wherein the charge ratio of host and guest and the synthesis temperature, among the synthesis conditions, are modified.

Example 2

One gram of natural graphite powder of an average particle size of 400 μm, 3.38 g of FeCl$_3$ and 5.79 g of PbCl$_2$ were mixed together and reacted at 300° C. in a nitrogen stream of 20 ml/min for one hour. After washing in heated aqueous hydrochloric acid, the sample thus obtained was analyzed with energy dispersive spectroscopy. It was observed that both of the chlorides PbCl$_2$ and FeCl$_3$ were intercalated into graphite and formed a stage 4 GIC even under this synthesis condition.

Example 3

One gram of natural graphite powder of an average particle size of 400 μm, 3.38 g of FeCl$_3$ and 5.79 g of PbCl$_2$ were mixed together and reacted at 250° C. in a nitrogen stream of 15 ml/min for one hour. As in Example 2, it was confirmed in this case that PbCl$_2$ along with FeCl$_3$ was intercalated into graphite and formed a stage 2 GIC.

As has been described above, PbCl$_2$ and other metal halides are mixed at a predetermined ratio with graphite. The resulting mixture is reacted together at a predetermined temperature to synthesize a graphite intercalation compound, to enable the PbCl$_2$ to be intercalated, so there can be realized a higher stability in an atmosphere of high humidity, which is not provided by conventional metal halide GICs, in addition to the high conductivity as the advantage of conventional metal halide GICs. Furthermore, the raw materials are not costly and the production thereof is easy. The application thereof as an excellent conductive material can be expected. That is, there can be produced in inexpensive fashion a resistor with a lower resistance and a conductive material with high conductivity, which properties are not easily changed in an environment of higher temperatures and higher humidities, so the practical value thereof is extremely high.

As has been explained insofar, a novel graphite intercalation compound can be produced by intercalating at least PbCl$_2$ into in graphite in accordance with the present invention. The graphite intercalation compound not only demonstrates a higher conductivity but also has excellent moisture-resistant stability, so the compound is highly useful as a conductive material. Therefore, the present invention can provide a graphite intercalation compound having extremely high practical effects, and the method for producing the same.

What is claimed is:

1. A graphite intercalation compound comprising PbCl$_2$ and FeCl$_3$ intercalated into graphite, wherein the molar ratio of Pb to Fe is at least 0.5, and wherein the combined weight of the PbCl$_2$ and FeCl$_3$ is at least 40% of the weight of the graphite.

2. A method for producing a graphite intercalation compound comprising:
   mixing a raw material comprising graphite with PbCl$_2$ and FeCl$_3$ to or a mixture, wherein the molar percentage of PbCl$_2$ is between 40 and 95 percent of the sum of PbCl$_2$ and FeCl$_3$, and wherein the weight of the sum of the PbCl$_2$ and FeCl$_3$ is at least 40% of the weight of the graphite; and
   heating the mixture for a sufficient time at a temperature between 300° C. and 550° C. to intercalate PbCl$_2$ and FeCl$_3$ into graphite.

3. The method of claim 2 in which the molar percentage of PbCl$_2$ and the temperature are within Region A of FIG. 6.

4. The graphite intercalation compound of claim 1 wherein the molar ratio is at least 0.24.

5. The graphite intercalation compound of claim 1 wherein the molar ratio is at least 0.5.

* * * * *

UNITED STATES PATENT AND TRADEMARK OFFICE
CERTIFICATE OF CORRECTION

PATENT NO.    :   5,346,650
DATED         :   September 13, 1994
INVENTOR(S)   :   Osamu Toda, Michio Inagaki and Masahiko Ohhira

It is certified that error appears in the above-identified patent and that said Letters Patent is hereby corrected as shown below:

Col. 6, line 43, delete "0.5" and insert --0.05--;

Col. 6, line 49, delete "or" and insert --form--.

Signed and Sealed this

Tenth Day of January, 1995

Attest:

BRUCE LEHMAN

*Attesting Officer*    Commissioner of Patents and Trademarks